US00RE40286E

(19) United States
(12) Reissued Patent
Biess et al.

(10) Patent Number: US RE40,286 E
(45) Date of Reissued Patent: May 6, 2008

(54) SYSTEM AND METHOD FOR SUPPLYING AUXILIARY POWER TO A LARGE DIESEL ENGINE

(75) Inventors: Lawrence J. Biess, Jacksonville, FL (US); Christer T. Gotmalm, Sault Ste Marie (CA)

(73) Assignee: CSX Transportation, Inc., Jacksonville, FL (US)

(21) Appl. No.: 11/116,459

(22) Filed: Apr. 28, 2005

Related U.S. Patent Documents

Reissue of:
(64) Patent No.: 6,470,844
Issued: Oct. 29, 2002
Appl. No.: 09/773,072
Filed: Jan. 31, 2001

(51) Int. Cl.
*F02N 17/02* (2006.01)

(52) U.S. Cl. ..... 123/142.5 R
(58) Field of Classification Search ..... 123/142.5 R, 123/DIG. 8, 179.19, 142.5 E, 196 AB, 198 D
See application file for complete search history.

(56) References Cited

U.S. PATENT DOCUMENTS 3,844,130 A * 10/1974 Wahnish
RE29,579 E * 3/1978 Simon
4,091,613 A * 5/1978 Young
4,249,491 A * 2/1981 Stein ..... 123/142.5 R
4,344,364 A * 8/1982 Nickles et al.
4,424,775 A * 1/1984 Mayfield, Jr. et al. ... 123/142.5 R
4,425,763 A * 1/1984 Porta et al.
4,448,157 A * 5/1984 Eckstein et al.
4,494,372 A * 1/1985 Cronin
4,503,666 A * 3/1985 Christoff
4,531,379 A * 7/1985 Diefenthaler, Jr.
4,665,319 A * 5/1987 Seepe et al.
4,682,649 A * 7/1987 Greer
4,711,204 A * 12/1987 Rusconi ..... 123/142.5 R
4,762,170 A * 8/1988 Nijjar et al.
4,775,826 A * 10/1988 Klema
4,825,663 A * 5/1989 Nijjar et al.
4,935,689 A * 6/1990 Fujikawa et al. ..... 123/142.5 R
5,619,956 A * 4/1997 Koziara et al.

* cited by examiner

*Primary Examiner*—Stephen K. Cronin
*Assistant Examiner*—Hyder Ali
(74) *Attorney, Agent, or Firm*—McGuireWoods LLP

(57) ABSTRACT

A system and method for providing auxiliary power to a large diesel engine allowing shutdown of such large engine in all weather conditions. An auxiliary power unit made up of a secondary engine coupled to an electrical generator is provided. An automatic control system shuts down the primary engine after a period of idling and the auxiliary power unit provides electrical power for heating and air conditioning. In cold weather, the auxiliary power unit maintains the primary engine coolant and lube-oil warm to facilitate engine restart. The coolant system is kept warm using a heat exchanger and electrical heaters. The lube-oil system is kept warm using a recirculating pump and electrical heaters. In warm weather, the auxiliary power unit provides electrical power for air conditioning and other hotel loads. The auxiliary power unit isolates the primary engine batteries during operation and provides electrical power for hotel and non-vital loads.

20 Claims, 8 Drawing Sheets

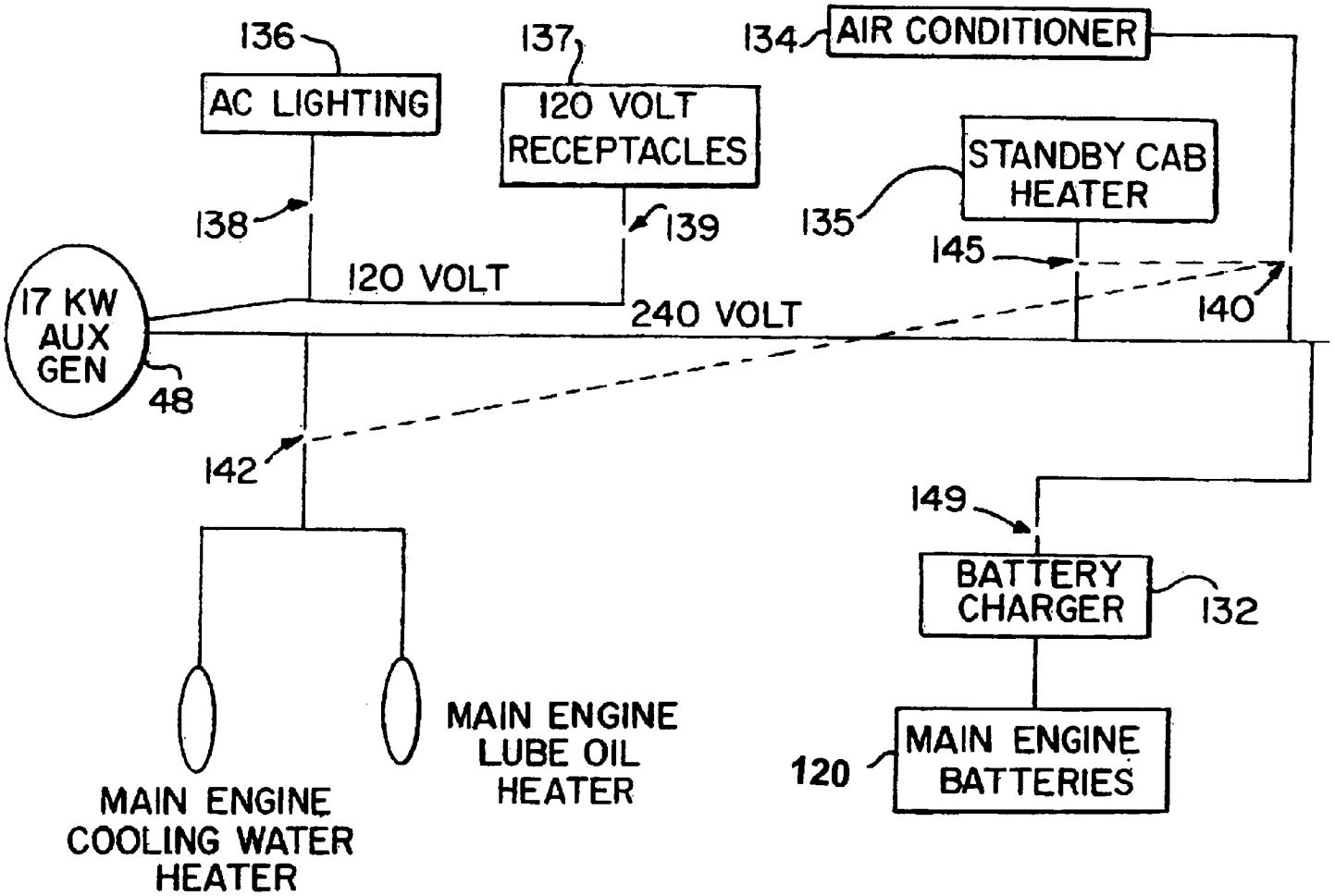
FIG. 6
AMENDED

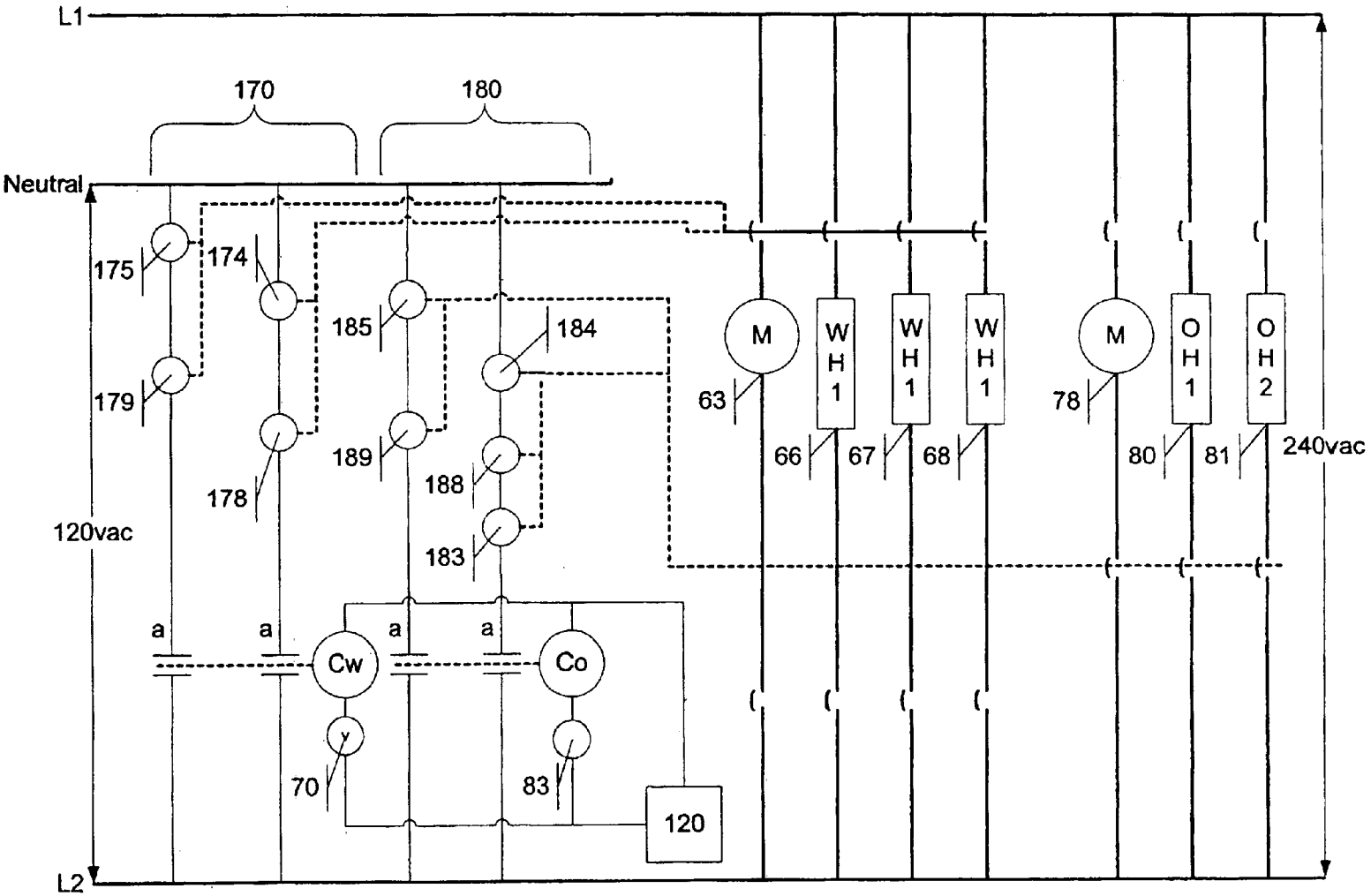
FIG. 8
AMENDED

SYSTEM AND METHOD FOR SUPPLYING AUXILIARY POWER TO A LARGE DIESEL ENGINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to large engine systems, but more specifically to a system and method for supplying auxiliary power to a locomotive engine to permit automatic shutdown of such locomotive engine in all weather conditions.

2. Background of the Invention

Generally, large diesel engines, such as locomotive engines are not shut down during cold weather conditions due to the difficulty in restarting. Diesel engines do not have the benefit of an electric spark to generate combustion and must rely on heat generated by compressing air to ignite fuel in the engine cylinders. In low temperature conditions (ambient temperatures below about 40° F.), two major factors contribute to the difficulty in starting a diesel engine. First, cold ambient air drawn into the engine must be increased in temperature sufficiently to cause combustion. Second, diesel fuel tends to exhibit poor viscous qualities at low temperatures, making engine starting difficult. Furthermore, engine oil that provides lubrication for the engine is most effective within specific temperature limits, generally corresponding to normal operating temperature of the engine. When cold, the engine lube-oil tends to impede engine starting. Moreover, most engines require a large electrical supply, typically provided by a battery, in order to turn over and start the engine. Unfortunately, batteries are also adversely affected by severe cold weather.

In cold weather, large engines are typically idled overnight to avoid the necessity to restart in the morning and to provide heat to the crew space. Locomotives that must operate in extremely cold environmental conditions must be run continuously, at high fuel cost, or, when shutdown, must be drained of engine coolant and provided supplemental electrical service and heaters, also at high cost.

In warm weather, locomotive engines typically idle to provide air conditioning and other services, including lighting, air pressure and electrical appliances. If the locomotive is shut down, solid-state static inverters that transform dc power from the locomotive batteries to useful ac power can provide electrical power for air conditioning and other services. Devices such as inverters are parasitic loads that tend to drain the batteries, which will adversely affect engine reliability. Alternatively, wayside electrical power can be supplied, but it generally does not maintain air conditioning.

Several systems have been designed to maintain warmth in a large diesel engine under low temperature ambient conditions. For example, U.S. Pat. No. 4,424,775 shows an auxiliary engine for maintaining the coolant, lube-oil, and batteries of a primary diesel engine in restarting condition by using the heat of the auxiliary engine exhaust, to keep coolant, lube-oil, and batteries sufficiently warm. U.S. Pat. No. 4,762,170 shows a system for facilitating the restarting of a truck diesel engine in cold weather by maintaining the fuel, coolant, and lube-oil warm through interconnected fluid systems. U.S. Pat. No. 4,711,204 discloses a small diesel engine for providing heat to the coolant of a primary diesel engine in cold weather. The small engine drives a centrifugal pump with restricted flow such that the coolant is heated, and then pumped through the primary cooling lines in reverse flow. In many of such systems, an electrical generator or inverter may be included to maintain a charge for the batteries.

None of them, however, specifically address other problems associated with the idling of a large diesel engine, such as, primary engine wear, wet stacking due to piston ring leakage as a result of idling for long periods of time in cold weather, high fuel and lube-oil consumption, and so forth. No effective alternative to warm weather idling is known to exist.

SUMMARY OF THE INVENTION

An objective of the present invention is to provide a reliable auxiliary power supply system to allow for shutting down a primary diesel engine in all weather conditions.

Another object is to provide a system that will start an auxiliary power unit to maintain a primary engine warm in response to a predetermined ambient temperature.

Another object is to provide a system that will shut down a primary engine after a certain predetermined period of time, regardless of ambient temperature, and start an auxiliary power unit.

Another object is to provide a system that will maintain fuel, coolant, and lube-oil of a primary engine at a sufficiently warm temperature to facilitate restarting such primary engine in cold weather. A more specific objective of the present invention is to keep a primary engine coolant warm by using electrical heaters and a heat exchanger. A related object is to keep a primary engine lube-oil warm by using a recirculating pump and electrical heaters.

A further objective of the present invention is to provide heating and air conditioning to the cab compartment for crew comfort.

Another object of the present invention is to provide an electrical generator for charging the primary engine's batteries, as well as for generating standard 240 vac and 120 vac to permit the use of non-vital and hotel loads.

A more specific object of the invention is to isolate a primary engine's batteries when such primary engine is shut down to prevent discharge of the batteries.

The present invention provides such a system and method that furnishes cold weather layover protection automatically in a mobile package that will protect primary engine systems and cab components against freezing. Prior art solutions require the primary engine to remain operating or require use of wayside stations. The present invention allows for automatic shutdown of a primary engine instead of extended idling operation while maintaining a charge on the primary engine's battery. Prior art solutions that allow automatic primary engine shutdown require the primary engine to be automatically started and idled in order to protect the primary engine from freezing, or that the primary engine start in response to a low primary engine battery charge. The present invention allows for the operation of cab air conditioning while the primary engine is shut down. Prior art solutions require the primary engine to operate in order to provide air conditioning. The present invention provides electrical power in standard household voltages for hotel and non-vital loads allowing for the installation and use of commonly available electrical devices without the need to maintain the primary engine operating. Prior art solutions rely upon the use of 74 vdc locomotive power with specially designed components. Such components are expensive and in limited supply since they must be designed to operate on an unconventional voltage not widely used outside the railroad industry, or they require the use of solid-state inverters. In either case, the primary engine must remain operating to provide electrical power or the batteries will discharge.

BRIEF DESCRIPTION OF THE DRAWINGS

The above and other features, aspects, and advantages of the present invention are considered in more detail, in relation to the following description of embodiments thereof shown in the accompanying drawings, in which:

FIG. 6 is a block diagram illustration of electrical components of the invention for describing electrical control features of an embodiment of the present invention;

FIG. 8 is an wiring diagram of electrical control circuits for describing operational features of an embodiment of the invention.

DETAILED DESCRIPTION OF THE INVENTION

Figure 1:
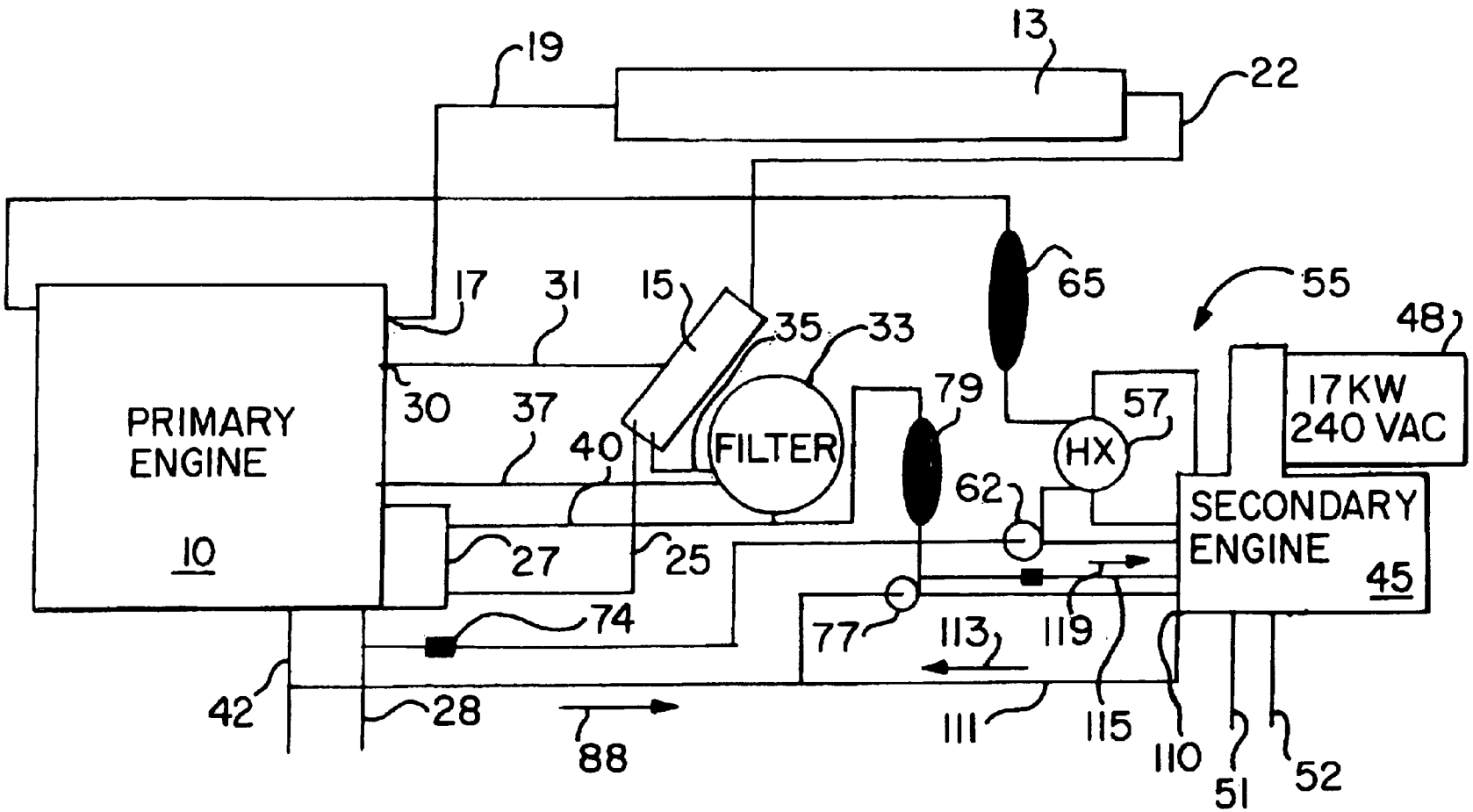
FIG. 1 is a schematic overview of components of an embodiment of the present invention.

The invention summarized above and defined by the enumerated claims may be better understood by referring to the following detailed description, which should be read in conjunction with the accompanying drawings in which like reference numbers are used for like parts. This detailed description of an embodiment, set out below to enable one to build and use an implementation of the invention, is not intended to limit the enumerated claims, but to serve as a particular example thereof. Those skilled in the art should appreciate that they may readily use the conception and specific embodiment disclosed as a basis for modifying or designing other methods and systems for carrying out the same purposes of the present invention. Those skilled in the art should also realize that such equivalent assemblies do not depart from the spirit and scope of the invention in its broadest form.

The present invention enables an improved system for providing heating or cooling and electricity to a railroad locomotive in all operating environments, and saves locomotive fuel and lubricating oil. An auxiliary power unit comprising a diesel engine coupled to an electrical generator is installed in a locomotive cab. In a preferred embodiment, the engine may be a turbo charged, four-cylinder diesel engine, such as one manufactured by Kubota, and rated at about 32 brake horsepower, at 1800 RPM. The auxiliary unit engine can draw fuel directly from the main locomotive fuel tank. Equipping the auxiliary unit with a 20-gallon lube-oil sump and recirculating pump to permit extended oil change intervals can minimize maintenance of such auxiliary unit engine. For protection of the auxiliary unit engine, it should also be equipped with over-temperature and low lube-oil pressure-shutdowns-to-prevent engine damage in the event that the engine overheats or runs low on lube-oil.

In a preferred embodiment, the electrical generator may be a 17 kva, 240 vac/60 Hz single-phase generator, mechanically coupled to such engine. A 240 vac/74 vdc battery charger, such as a Lamarche A-40 locomotive battery charger for the locomotive batteries is provided to maintain the locomotive battery charged whenever the auxiliary unit is operating.

Referring now to the drawings, there is presented a system overview of an exemplary embodiment of the present invention. In a specific embodiment, illustrated in FIG. 1, a primary engine 10 has an integral cooling system including radiator 13 for dissipating heat absorbed from primary engine 10 and support components such as lube-oil cooler 15. The flow path of coolant for the primary engine 10 forms a closed loop. Coolant exits primary engine 10 at junction 17 through exit conduit 19 and flows to radiator 13 wherein heat is transferred from such coolant to the atmosphere. Such coolant flows through transfer conduit 22 to oil cooler 15 wherein heat is transferred from lubricating oil for primary engine 10 to such coolant. Such coolant flows through return conduit 25 to reenter primary engine 10 at strainer housing 27. Engine coolant drain line 28 is provided to enable removal of coolant during cold weather to prevent freeze damage.

Primary engine lube-oil provides lubrication for primary engine 10 and helps remove heat of combustion from primary engine 10. Such lube-oil exits primary engine 10 at junction 30 through exit pipe 31 to oil cooler 15 where it transfers heat to the primary coolant. Lube-oil exits oil cooler 15, travels to oil filter 33 through connector pipe 35 and returns to primary engine 10 through return pipe 37. Filter drain line 40 connects to strainer housing 27 and is provided to enable draining of oil from the system during periodic maintenance. During periodic oil changes, lube-oil is drained from the entire system through lube-oil drain 42.

In accordance with the present invention there is provided a secondary engine 45 having an electrical generator 48 mechanically coupled to such secondary engine 45. Secondary engine 45 may be a turbo charged, four-cylinder diesel engine, such as one manufactured by Kubota, and rated at 32 bhp at 1800 RPM. Such engine can draw fuel directly from the primary engine fuel tank. Secondary engine 45 draws fuel for operation from a common fuel supply for the primary engine 10 through fuel connections 51, 52. Secondary engine 45 presents a separate closed loop auxiliary coolant system 55 including heat exchanger 57, which is designed to transfer heat generated by operation of secondary engine 45 to a system designed to maintain primary engine 10 warm. Auxiliary coolant in such separate closed loop system 55 flows through secondary engine 45 and absorbs waste heat generated by internal combustion within secondary engine 45. Such auxiliary coolant flows to heat exchanger 57 where it transfers such absorbed heat to primary engine coolant in a separate loop.

Figure 2:
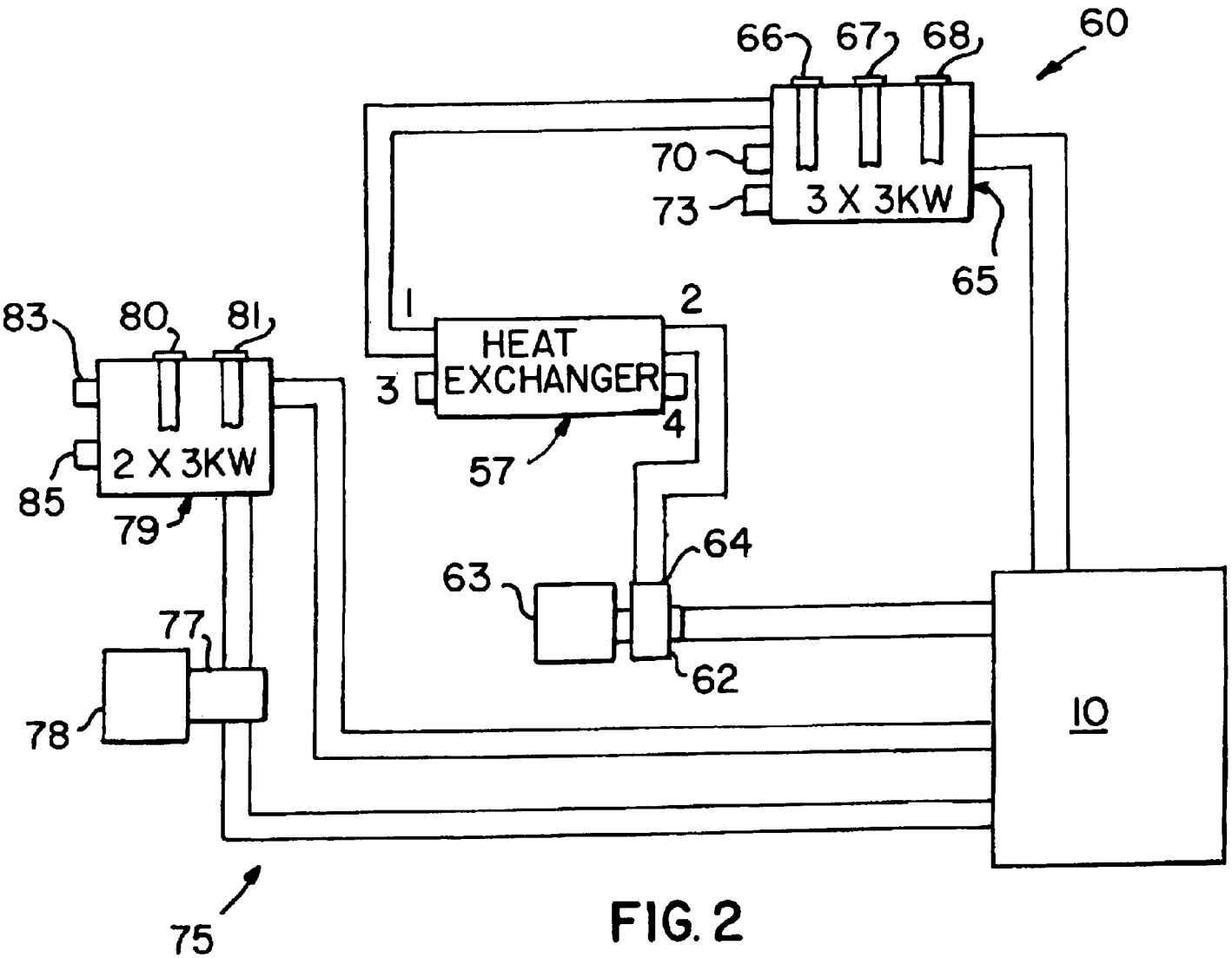
FIG. 2 is a block diagram illustration of mechanical components of an embodiment of the invention.

Referring to FIG. 2, two auxiliary loops are provided to maintain primary engine 10 warm in cold environmental conditions. The present apparatus utilizes two pumps shown at 62 and 77. Pump 62 is used for conditioning of coolant. Pump 77 is used for conditioning of lube-oil. Coolant loop 60 includes coolant pump 62 which can be electrically driven, or, in an alternate embodiment, can be driven directly by secondary engine 45. The inlet of pump 62 is operatively connected by a conduit to a suitable location in the coolant system of primary engine 10.

Pump 62 is powered by an electric motor 63. Its outlet at 64 is connected to a conduit leading to the inlet of heat exchanger 57. Coolant is discharged from pump 62 to heat exchanger 57. (For clarity, the connections on heat exchanger 57 have been numbered in FIGS. 2 and 3.) Coolants enters heat exchanger 57 at 2 and exits at 1, to coolant heater 65. A conduit connects the outlet of heat exchanger 57 to coolant heater 65.

Coolant heater 65, in coolant loop 60, augments heat exchanger 57 to add heat to primary engine coolant. In a preferred embodiment, coolant heater 65 includes three electrical water heater elements 66, 67, 68 of about 3 kw each. Alternate embodiments can include more or less heater elements and heater elements of different sizes. Coolant heater 65 includes coolant thermostat 70 for determining coolant temperature and thermometer 73 for displaying primary engine temperature. Coolant thermostat 70 is employed in a coolant temperature control circuit as described later herein. In a preferred embodiment, coolant from primary engine 10 is drawn from a connection in engine coolant drain line 28 (FIG. 1) by the suction of pump 62. Other coolant suction locations can be selected as desired. Coolant then travels to heat exchanger 57 and coolant heater 65 and returns to primary engine 10 via a return conduit. Such conduit may include a suitable check valve and isolation valve (not shown). Such a check valve may permit passage of coolant to pump 62, but does not permit entry of liquid into coolant loop 60 upstream of coolant heater 65 when primary engine 10 is operating. A primary engine water drain valve 74 (FIG. 1) opens and drains primary engine 10 of coolant in order to protect primary engine 10 from freeze damage in the event that secondary engine 45 fails to start and no operator action is taken. Control of primary engine coolant temperature by components of coolant loop 60 is described in more detail later herein with reference to FIGS. 7 and 8.

Lube-oil loop 75 includes oil pump 77 which can be electrically driven, or, in an alternate embodiment, can be driven directly by secondary engine 45. In a preferred embodiment, oil pump 77 may be a positive displacement pump and a motor 78 powers the oil pump 77. Oil heater 79 in lube-oil loop 75 adds heat to primary engine lube-oil. In a preferred embodiment, oil heater 79 includes two electrical oil heater elements 80, 81 of about 3kw each. Alternate embodiments can include more or less heater elements and heater elements of different sizes. Oil heater 79 includes oil thermostat 83 for determining lube-oil temperature and thermometer 85 for displaying primary engine lube-oil temperature. Oil thermostat 83 is employed in an oil temperature control circuit as described later herein. In a preferred embodiment, oil from primary engine 10 is drawn from a connection in lube-oil drain line 42 (FIG. 1) by the suction of oil pump 77 in the direction of arrow 88 (FIG. 1). Other oil suction locations can be selected as desired. Lube-oil is discharged from pump 77 to oil heater 79 and returns to primary engine 10 via a connection in filter drain line 40 (FIG. 1). Other oil return locations can be selected as desired. Control of primary engine lube-oil temperature by components of lube-oil loop 75 is described in more detail later herein with reference to FIGS. 7 and 8.

Figure 3:
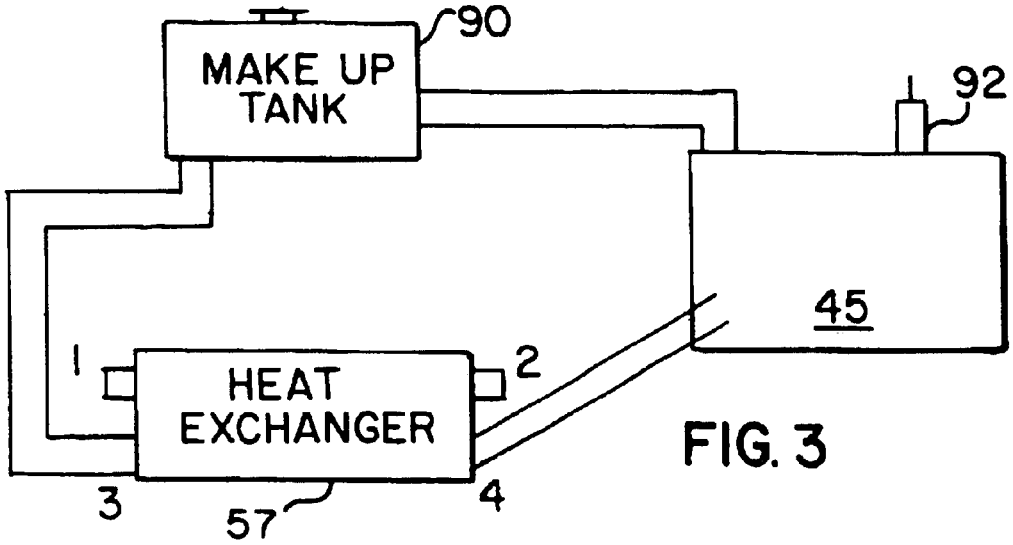
FIG. 3 is a block diagram illustration of mechanical components of the invention for describing features of an auxiliary engine coolant system.

FIG. 3 illustrates an auxiliary coolant system for secondary engine 45. Coolant in such system absorbs waste heat of combustion from secondary engine 45 and transfers such heat in heat exchanger 57 to coolant loop 60 (FIG. 2). (For clarity, the connections on heat exchanger 57 have been numbered in FIGS. 2 and 3.) Auxiliary coolant enters heat exchanger 57 at 4 and exits at 3, and then travels to make up water tank 90 and returns to secondary engine 45. Make up water tank 90 is disposed in such auxiliary coolant system to ensure sufficient coolant is available to safely operate secondary engine 45. An engine temperature-sensing device 92 is included to display operating temperature of secondary engine 45.

Figure 4:
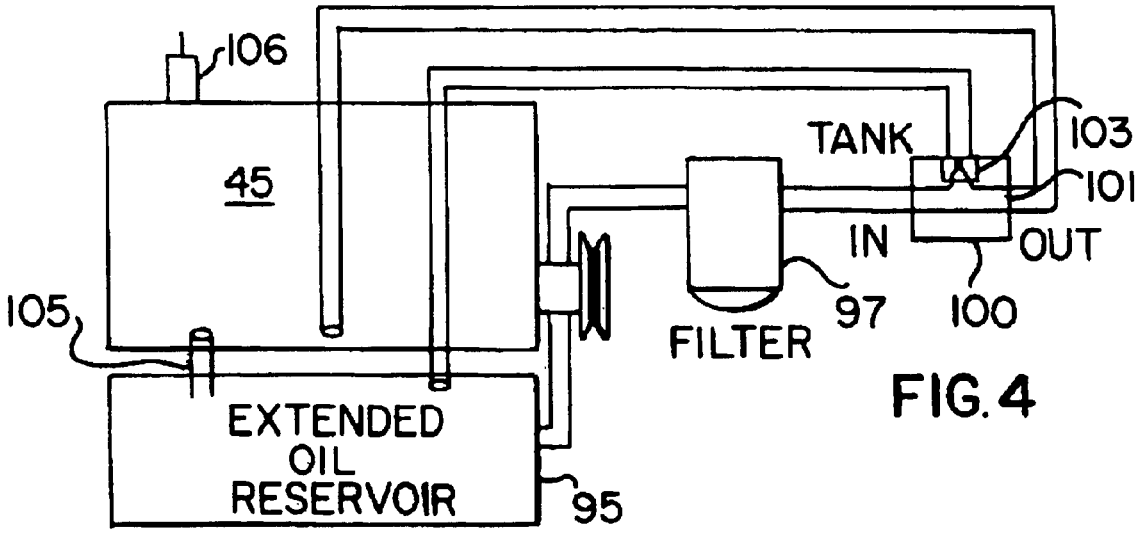
FIG. 4 is a block diagram illustration of mechanical components of the invention for describing features of an auxiliary engine lube-oil system.

FIG. 4 illustrates a lube-oil system for secondary engine 45. A large oil sump 95 or reservoir is provided to enable extended operation between oil changes in conjunction with periodic maintenance of primary engine 10. Oil is drawn from sump 95 through filter 97 to oil change block 100, which contains a metering nozzle 101 to control the amount of oil flow to secondary engine 45. Also contained in oil change block 100 is an integral relief valve 103 to protect secondary engine components from an overpressure condition. If relief valve 103 lifts, oil is directed back to sump 95. Such secondary engine lube-oil system is also provided with a crankcase overflow 105 to prevent damage to secondary engine components from excess oil in the engine crankcase. Engine oil pressure and oil temperature sensing devices 106 are included to display operating oil temperature and pressure of secondary engine 45. For protection of the secondary engine 45, it is also equipped with over temperature and low lube-oil pressure shutdowns to prevent engine damage in the event that the engine overheats or runs low on lube-oil.

In an alternate embodiment, the lube-oil system of secondary engine 45 can be cross-connected with lube-oil loop 75 of primary engine 10. Referring to FIG. 1, oil can be drawn from secondary engine 45 at junction 110 through pipe 111 in the direction identified by arrow 113, and then into oil pump 77. At least a portion of the discharge of oil pump 77 is directed back to secondary-engine 45 through connecting pipe 115 as indicated by arrow 119. Equipping the secondary engine 45 with a large lube-oil sump, such as 20-gallon capacity and pump 77 can permit extended oil change intervals and minimize maintenance of secondary engine 45.

Figure 5:
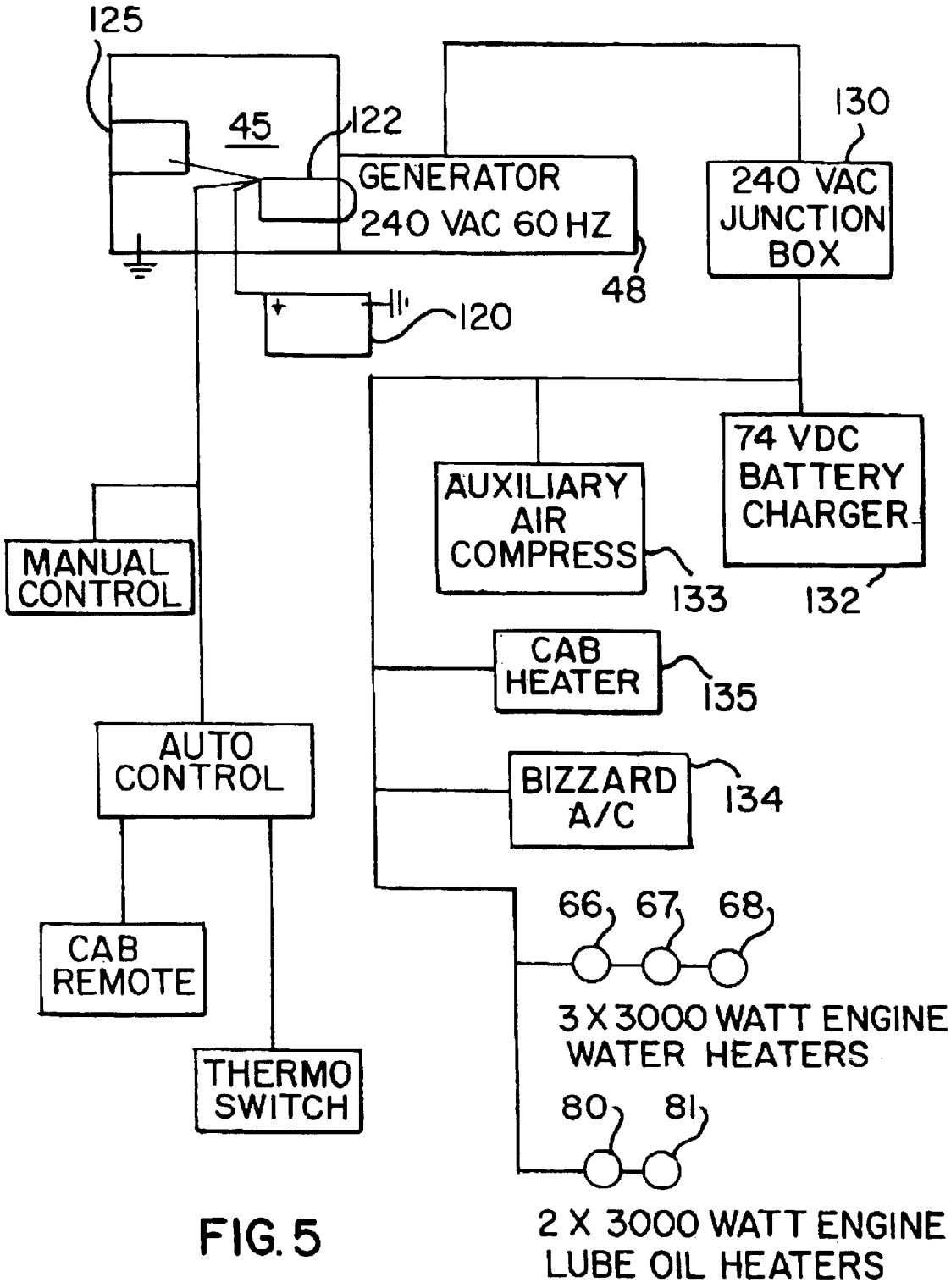
FIG. 5 is a block diagram illustration of electrical components of the invention for describing operational features of an embodiment of the present invention.

FIG. 5 is a block diagram overview of an electrical distribution system according to an embodiment of the present invention. Electrical power to start secondary engine 45 is provided by a separate battery 120 dedicated to such purpose, which may be a standard 12 vdc battery. Starter 122 turns over secondary engine 45 upon a start signal as described later herein in relation to FIG. 9. Alternator 125 maintains battery 120 in a ready condition during operation of secondary engine 45. Electrical generator 48 may be a 17 kva, 240 vac/60 Hz single-phase generator, mechanically coupled to secondary engine 45. Other size and capacity generators may be used. The output of generator 48 is routed to output junction box 130 where electrical power is distributed to selected electrical loads such as, 240 vac/74 vdc battery charger 132, such as a Lamarche A-40 locomotive battery charger for the locomotive batteries to maintain the primary engine battery charged whenever the secondary engine is operating. Other electrical loads may include auxiliary air compressor 133, air conditioner unit 134, and cab heater 135. In a preferred embodiment, cab comfort may be maintained during cold weather periods by supplemental cab heaters 135 that respond to a wall-mounted thermostat. There may also be provided a 240 vac cab air conditioner 134 to maintain cab comfort during warm weather periods. There can also be provided an electrical or mechanically driven air compressor 133 to maintain train line air pressure and volume.

Other 240 vac electrical loads include electrical water heater elements 66, 67, 68, and electrical oil heater elements 80, 81. The electric water heater elements and the electric oil heater elements serve two purposes. One purpose is to provide immersion heat for the coolant loop 60 and lube-oil loop 75. The second purpose is to load the secondary engine 45 through generator 48 and transfer the heat generated by this load through heat exchanger 57 into primary engine coolant in loop 60.

Referring to FIG. 6, 240 vac output from generator 48 can also be reduced to standard household 120 vac for lighting 136 and receptacles 137, through circuit breakers 138 and 139 respectively. 240 vac and 120 vac outlets provide for non-vital electrical and hotel loads. For operational purposes, some 240 vac breakers may be interlocked as illustrated in FIG. 6. For example, to prevent overload of generator 48 during warm weather operation, air conditioner circuit breaker 140 is interlocked with electric heater circuit breaker 142 such that both circuit breakers cannot be closed at the same time. In addition, there is no need to operate air conditioner 134 simultaneously with cab heaters 135, accordingly air conditioner circuit breaker 140 is interlocked with cab heater circuit breaker 145 such that both circuit breakers cannot be closed at the same time. Electric power for a 240 vac/74 vdc battery charger 132 is provided through circuit breaker 149 to maintain the primary engine battery 150 charged whenever the secondary engine 45 is operating.

Figure 7:
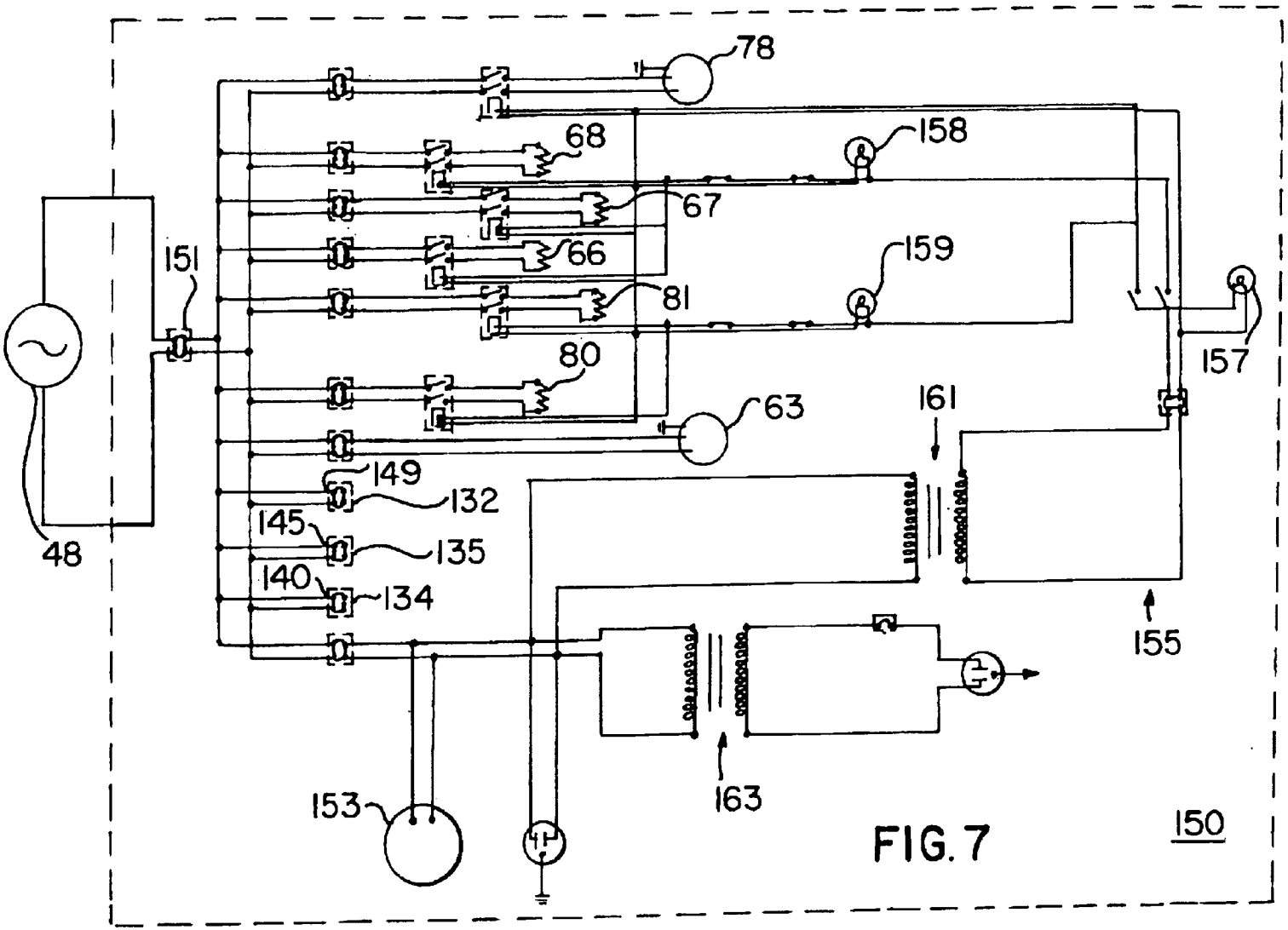
FIG. 7 is an electrical schematic diagram of a portion of FIG. 5.

FIG. 7 is an electrical schematic diagram of electrical control panel 150 included in a preferred embodiment for describing control features of the present invention. Control panel 150 contains circuit breakers and indicators for the electrical circuits. Main circuit breaker 151 is provided in panel 150 to break main power from generator 48. Circuit breakers are also provided for systems as described in relation to FIGS. 5 and 6, such as air conditioning 134, cab heater 135 and battery charger 132. Panel 150 also contains breakers for coolant water pump 80 and oil pump 77. Switches for oil heaters 80, 81 and for water heaters 66, 67, 68 are also provided in panel 150. Voltmeter 153, located in panel 150 is provided to monitor the output of generator 48. A 24 vac secondary voltage circuit 155 is supplied to operate contactors and indicating lighting, such as power "on" indicator light 157, water heater "on" indicator light 158, and oil heater "on" indicator light 159. 240 vac to 24 vac step down transformer 161 is located in panel 150. 240 vac to 120 vac step down transformer 163 is also located in panel 150.

To maintain the primary engine 10 warm in low ambient temperature conditions, a control system, such as illustrated in FIG. 8 is provided. Locomotive coolant pump 62, heat exchanger 57, and coolant heater 65, including immersion heaters 66, 67, 68 maintain the primary engine cooling temperature above a preselected temperature, such as 75° F. A positive displacement lube-oil recirculating pump 77 and oil heater 79, including immersion heaters 80, 81 maintain locomotive lube-oil temperature above a preselected temperature, such as 50° F.

The various components of the apparatus can be electrically controlled to provide automatic monitoring of its operation and thermostatic control of the temperature of the liquids being circulated through coolant loop 60 and lube-oil loop 75 to assure proper operation of the conditioning apparatus to maintain engine 10 in readiness for use. An electric control unit, such as shown in FIG. 8 is connected to the motors 63 and 78 for pumps 62, 77 respectively.

Coolant control circuit 170 controls operation of coolant pump 62 and coolant heater 65. The temperature of the coolant is monitored by thermostatic element 70, and flow responsive switches 174 and 175 monitor the flow rate of coolant. Should flow be interrupted, coolant control circuit 170 is capable of shutting down pump 62 to assure against damage to the coolant or equipment. Thermostatic element 70 further monitors the temperature of the coolant and properly operates heating elements 66, 67, 68 through heater element contact coil 178.

Under normal use, thermostatic element 70 is preset to a temperature at which the coolant is desired while circulating through engine 10, such as 75° F. Until the circulating coolant reaches this temperature, thermostatic element 70 will continue operation of heating elements 66, 67, 68 to add heat to coolant loop 60. The coolant is heated by direct contact along heating elements 66, 67, 68. When the coolant reaches the desired temperature, thermostatic element 70 will cause heating element contactor coil 178 to open the circuit to heating elements 66, 67, 68 until the liquid temperature again falls below such predetermined temperature level.

To insure against damage to the heating elements 66, 67, 68 due to lack of liquid recirculation, the flow control switches 174, 175 monitor the passage of coolant through coolant heater 65. So long as flow continues, switch 174 remains closed. It is opened by lack of flow through coolant heater 65. This activation is used to immediately open the circuit to the heating elements 66, 67, 68 to prevent damage to them and to prevent damage to the coolant within coolant heater 65. Coolant control circuit 170 also includes a time delay coil 179 capable of monitoring activation of flow control switch 175. If flow has ceased for a predetermined time, time delay coil 179 will then shut down the entire apparatus and require manual restarting of it. In this way, operation of the apparatus can be automatically monitored while assuring that there will be no damage to liquid being circulated, nor to the equipment or engine 10.

Lube-oil control circuit [170] *180* controls operation of lube-oil pump 77 and lube-oil heater 79. The temperature of the lube-oil is monitored by thermostatic element 83 and flow responsive switches 184 and 185 monitor the flow rate of lube-oil. Should flow be interrupted, the lube-oil control circuit 180 is capable of shutting down pump 77 to assure against damage to the oil or equipment. Thermostatic element 83 further monitors the temperature of the lube-oil and properly operates heating elements 80, 81 through heater element contact coil 188. High limit thermostat 183 operates as a safety switch to remove power from heating elements 80, 81 in the event lube-oil temperature exceeds a predetermined temperature.

Under normal use, thermostatic element 83 is preset to a temperature at which the lube-oil is desired to maintain engine 10 warm, such as 50° F. Until the circulating lube-oil reaches this temperature, thermostatic element 83 continues operation of heating elements 80, 81 to add heat to lube-oil loop 75. The lube-oil is heated by direct contact along heating elements 80, 81. When the lube-oil reaches the desired temperature, thermostatic element 83 will cause heating element contactor coil 188 to open the circuit to heating elements 80, 81 until the liquid temperature again falls below such predetermined temperature level. If the lube-oil reaches an unsafe temperature, high limit thermostat 183 will cause heating element contactor coil 188 to open the circuit to heating elements 80, 81 until the liquid temperature again falls below a predetermined temperature level.

To insure against damage to the heating elements 80,81 due to lack of liquid recirculation, the flow control switches 184, 185 monitor the passage of lube-oil through lube-oil heater 79. So long as flow continues, switch 184 remains closed. It is opened by lack of flow through lube-oil heater 79. This activation is used to immediately open the circuit to the heating elements 80, 81 to prevent damage to them and to prevent damage to the lube-oil within lube-oil heater 79. Lube-oil control circuit 180 also includes a time delay coil 189 capable of monitoring activation of flow control switch 185. If flow has ceased for a predetermined time, time delay coil 189 will then shut down the entire apparatus and require manual restarting of it. In this way, operation of the apparatus can be automatically monitored while assuring that there will be no damage to liquid being circulated, nor to the equipment or engine 10.

The purpose of the apparatus is to provide circulation of coolant and lubricant through the equipment or engine 10 while it is not operation. Pumps 62 and 77 are preset to direct liquid to the loops 60, 75 respectively at pressures similar to the normal operating pressures of the coolant and lubricant during use of the equipment or engine. Thus, the coolant and lubricant, or other liquids used in similar equipment, can be continuously circulated through the non-operational equipment to effect heat transfer while the equipment (or engine) is not in use. In the case of a lubricant, surface lubricant is also effected, maintaining the movable elements of the equipment in readiness for startup and subsequent use. This prelubrication of the nonoperational equipment surfaces minimizes the normal wear encountered between movable surfaces that have remained stationary for substantial periods of time.

Control logic provides for a cooldown period for the automatic heaters before automatic shutdown of secondary engine 45 to cool and protect such energized electric heaters.

Figure 9:
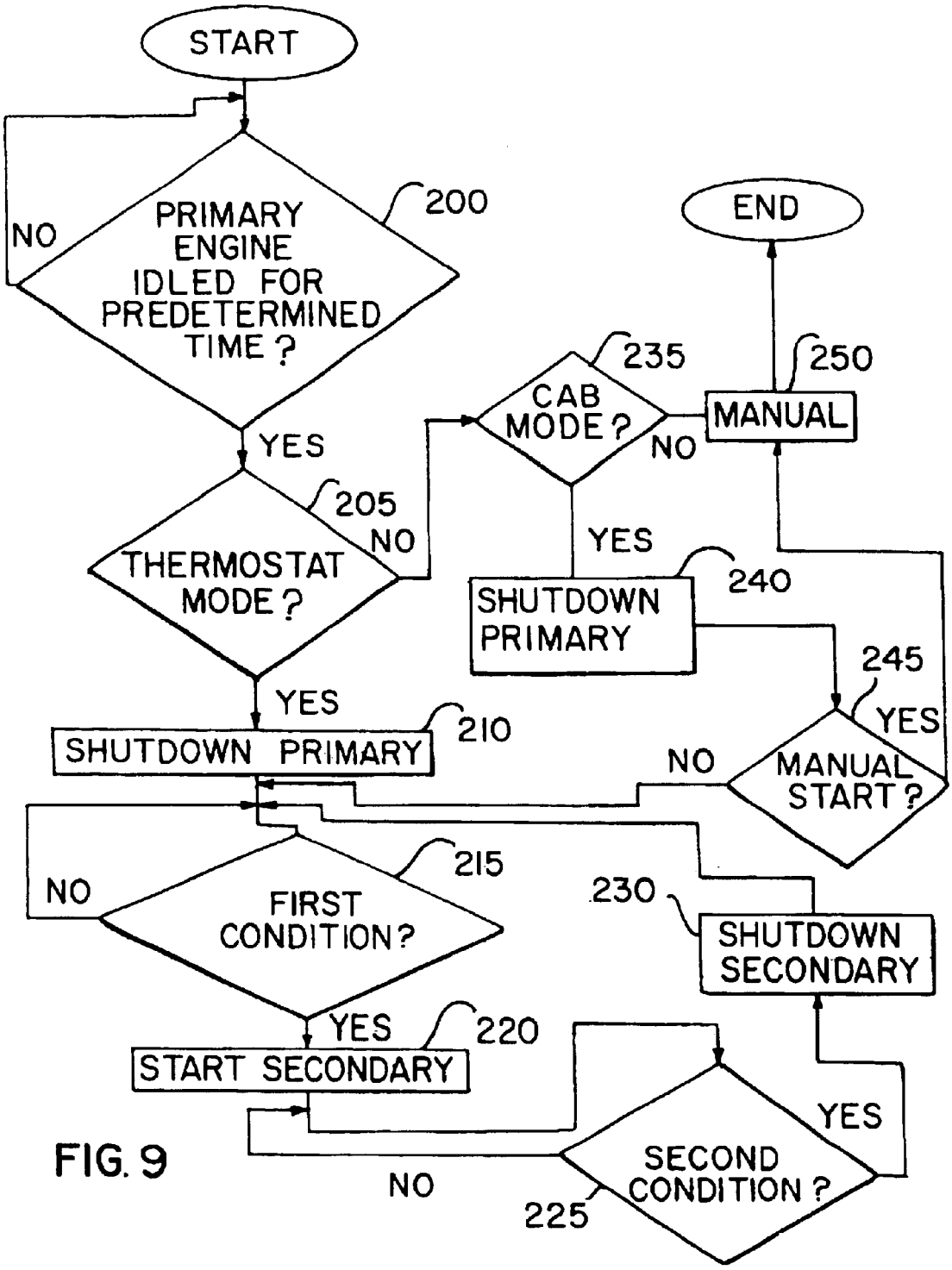
FIG. 9 is a flowchart illustrating logical steps carried out by one embodiment of the present invention for operation of the system disclosed herein.

In accordance with the present invention, the system can be operated in a variety of modes. FIG. 9 is a flowchart illustrating logical steps carried out by one embodiment of the present invention for operation of the system. In a preferred embodiment, the secondary engine 45 can be selected for operation locally at an engine control panel or remotely in the locomotive cab. Control logic permits operation in any of the three modes "thermostat", "cab", and "manual" described below.

During normal operation of primary engine 10, the secondary engine 45 is not in operation. An engine idle timer at block 200 determines if primary engine 10 has been idled for a predetermined period of inactivity and idle operation, such as 30 minutes. After such period of inactivity, the next logical step is to determine the mode of operation of secondary engine 45.

If secondary engine 45 is selected to the "thermostat" mode, indicated at block 205, automatic control features shut down primary engine 10 as indicated at block 210. The "thermostat" mode is a preferred mode of operation for maintaining primary engine 10 warm during cold weather ambient conditions. In "thermostat" mode, the control system shuts down the primary engine 10 after a predetermined period of inactivity and idle operation, such as 30 minutes. In response to a first predetermined environmental condition 215, such as low locomotive coolant temperature or low lube-oil temperature, the secondary engine 45 will start 220 in order to warm primary engine systems as described later herein. When a second predetermined environmental condition 225, such as the selected temperature exceeds an established set point, secondary engine 45 automatically shuts down 230. In a preferred embodiment, such environmental condition may be engine coolant temperature as measured by a primary engine block thermostat.

If secondary engine 45 is selected to the "cab" mode, indicated at block 235, automatic control features shut down primary engine 10 as indicated at block 240. The "cab" mode is a preferred mode of operation for warm weather operating to maximize fuel savings by limiting idling operation of primary engine 10. In "cab" mode, the control system automatically shuts down primary engine 10 after a predetermined period of inactivity and idle operation, such as 30 minutes. An operator can start secondary engine 45 manually as indicated at block 245. Secondary engine 45 remains operating upon operator command. If an operator does not start secondary engine 45, it will start automatically in response to a first predetermined environmental condition, such as low coolant temperature or low lube-oil temperature, and shut down when the selected temperature exceeds an established set point as described for "thermostat" control above. In an alternate embodiment, an override may be provided to permit extended idling operations at the discretion of the operator.

The "manual" mode, indicated at block 250 allows secondary engine 45 to be started by means of manually priming secondary engine 45. This provision allows for operation of secondary engine 45 in the event that automatic start up features malfunction, or to prime secondary engine 45, in the event it runs out of fuel.

In all modes of operation, secondary engine 45 charges the primary batteries 150 and provides power to thermostatically controlled cab heaters 140 and 120 vac lighting 136 and receptacles 137. In operation, when primary engine 10 is shut down automatically a blocking diode isolates the primary batteries 150 from 74 vdc loads to prevent discharge of the locomotive battery 150 during the shutdown period.

In an alternate embodiment, external audible and visual alarms can sound and light if secondary engine 45 fails to start during a thermostatically initiated start in cold weather.

In a still further embodiment, 120 vac internal and external lighting can be controlled by means of photo sensors and motion detectors for security of the locomotive.

While specific values, relationships, materials and steps have been set forth for purposes of describing concepts of the invention, it should be recognized that, in the light of the above teachings, those skilled in the art can modify those specifics without departing from basic concepts and operating principles of the invention taught herein. Therefore, for purposes of determining the scope of patent protection, reference shall be made to the appended claims in combination with the above detailed description.

What is claimed is:

1. An auxiliary power system for operation in cooperation with a primary engine having a battery, comprising (A) a secondary engine, and (B) control means having a timer, wherein:

(i) such control means shuts down such primary engine following a predetermined time period of idling of such primary engine; and (ii) such control means enables automatic operation of such secondary engine.

2. The auxiliary power system of claim 1, in which such control means starts such secondary engine in response to a predetermined ambient temperature if such primary engine is not operating.

3. The auxiliary power system of claim 1, further comprising an electrical power producing means driven by such secondary engine.

4. The auxiliary power system of claim 3, in which such electrical power producing means comprises a 240 vac, 60 Hz, single-phase electrical generator.

5. The auxiliary power system of claim 4, in which such electrical generator produces at least 17 kva of power.

6. The auxiliary power system of claim 4, further comprising battery charging means.

7. The auxiliary power system of claim 6, in which such control means (i) isolates the battery of the primary engine from all dc loads upon operation of such secondary engine, and (ii) continuously charges the battery during operation of such secondary engine.

8. The auxiliary power system of claim 1, further comprising (A) primary engine coolant pumping means, and (B) heat exchanging means.

9. The auxiliary power system of claim 8, further comprising engine coolant heating means.

10. The auxiliary power system of claim 9 further including, coolant temperature sensing means, and in which such control means maintains primary engine coolant temperature within a predetermined temperature range.

11. The auxiliary power system of claim 9, in which such engine coolant heating means comprises electric heaters.

12. The auxiliary power system of claim 1, further comprising primary engine lube-oil pumping means.

13. The auxiliary power system of claim 12, further comprising, lube-oil heating means.

14. The auxiliary power system of claim 13, further including, primary lube-oil temperature sensing means, and in which such control means maintains primary engine lube-oil temperature within a predetermined temperature range.

15. The auxiliary power system of claim 13, in which such lube-oil heating means comprises electric heaters.

16. The auxiliary power system of claim 1, further comprising a remotely operable primary engine coolant drain valve.

17. The auxiliary power system of claim 16, in which such control means causes such remotely operable drain valve to open and drain the primary engine coolant after a predetermined period of time in response to a predetermined ambient temperature if such primary engine is not operating and such secondary engine fails to start.

18. A method of supplying auxiliary power to a primary engine, comprising the steps of:

(A) providing a secondary engine coupled to an electrical generator;

(B) providing a controller having (i) a primary engine idle timer; and (ii) a plurality of selectable control modes;

(C) monitoring the operating condition of such primary engine;

(D) automatically shutting down such primary engine following idling of such primary engine for a predetermined period of time; and (E) operating such secondary engine in response to a predetermined condition of such primary engine.

19. Method of supplying auxiliary power to a primary engine of claim 18, wherein such predetermined condition of such primary engine is selected from the group consisting of:

(i) if such controller is selected to a first mode, (a) starting such secondary engine is response to a first selected coolant temperature or lube-oil temperature; and (b) shutting down such secondary engine is response to a second selected coolant temperature or lube-oil temperature;

(ii) if such controller is selected to a second mode, (a) enabling manual control of such secondary engine;

(b) starting such secondary engine is response to a first selected coolant temperature or lube-oil temperature; and (c) shutting down such secondary engine is response to a second selected coolant temperature or lube-oil temperature; and (iii) if such controller is selected to a third mode, (a) enabling manual control of such secondary engine.

20. Method of claim 18, further comprising providing heating means for such primary engine coolant, and providing heating means for such primary engine lube-oil.

* * * * *